June 19, 1945.     O. F. SOETBEER     2,378,870
INTERNAL SURFACE PROJECTOR
Filed June 12, 1943     4 Sheets-Sheet 2

INVENTOR.
OSCAR F. SOETBEER
BY

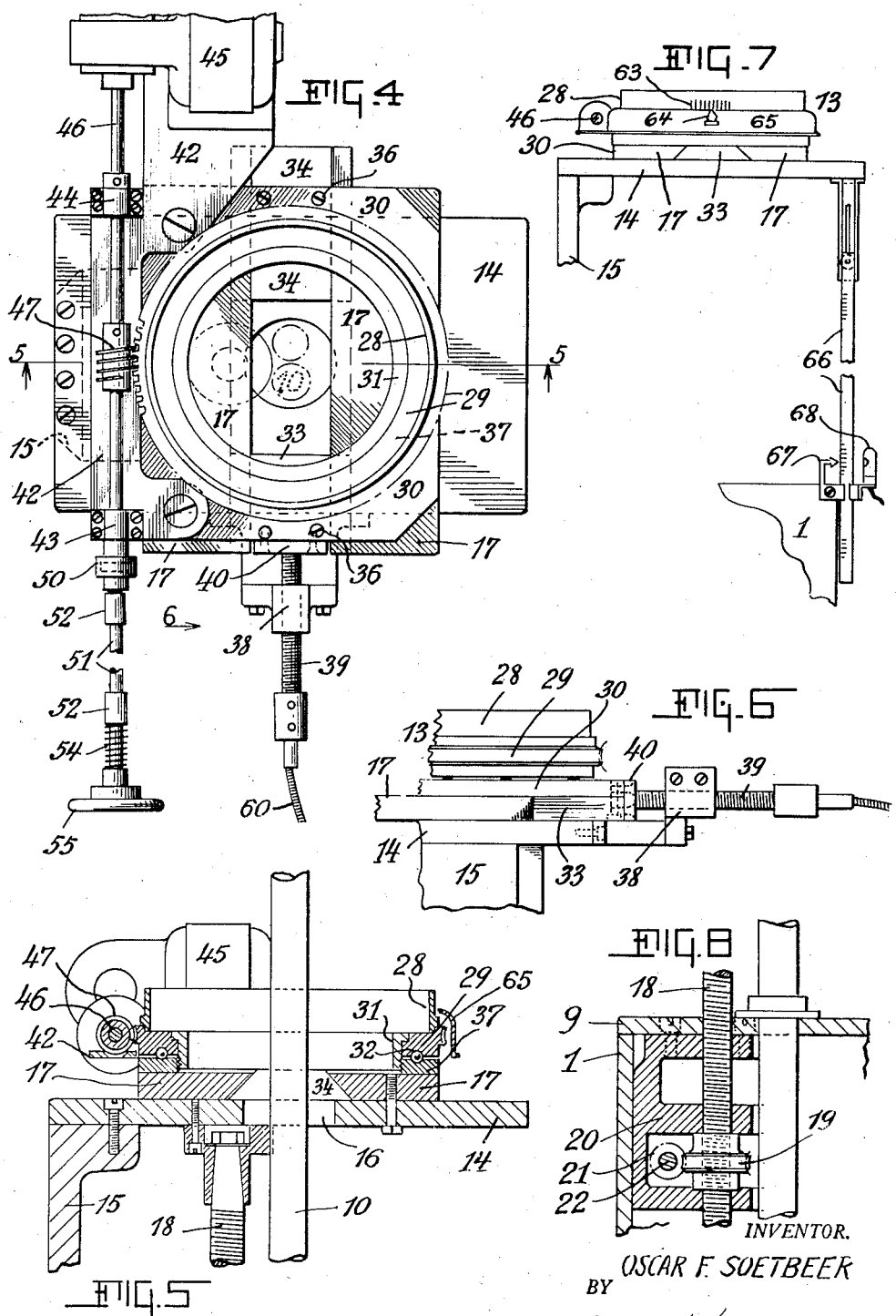

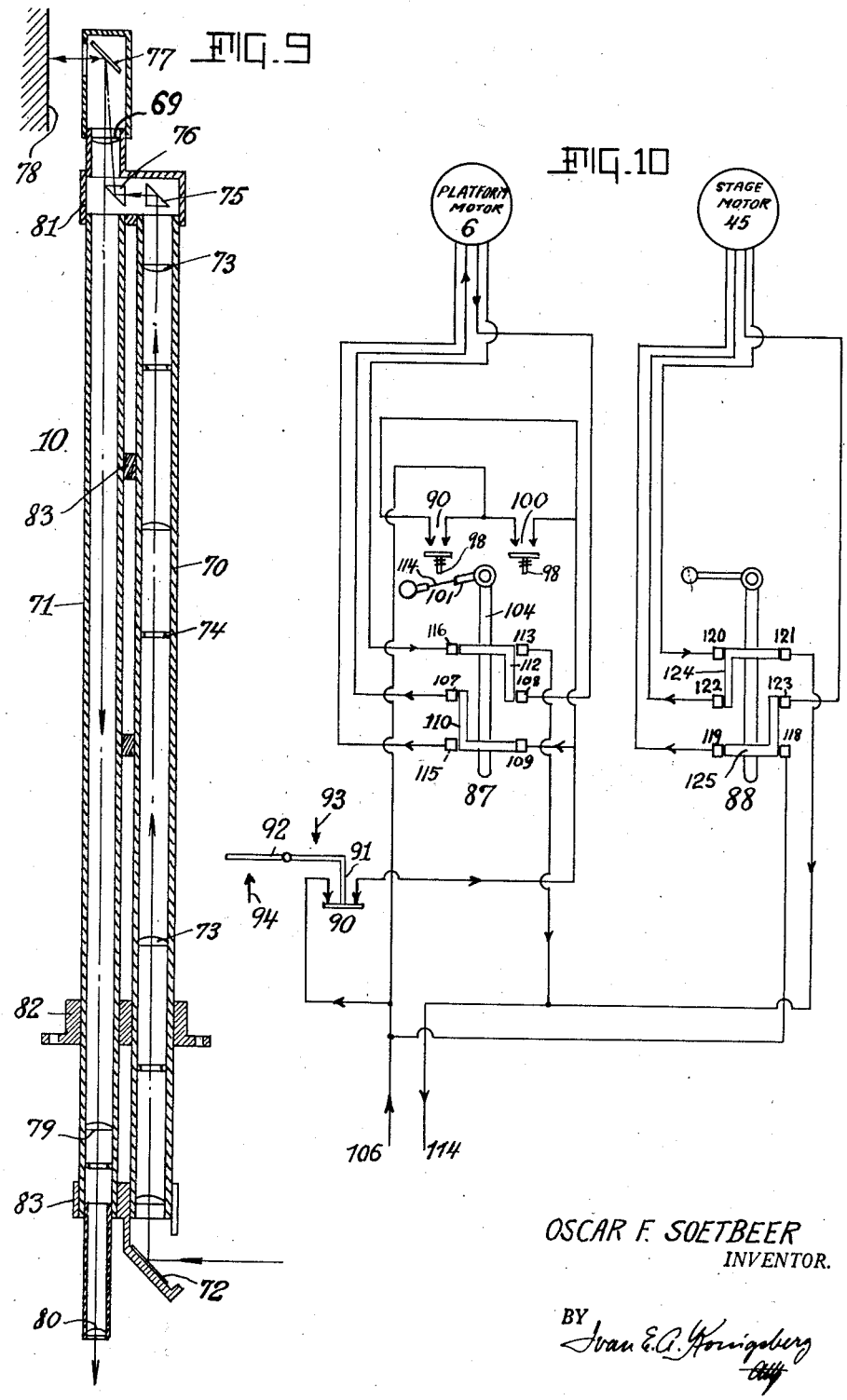

Patented June 19, 1945

2,378,870

UNITED STATES PATENT OFFICE 2,378,870

INTERNAL SURFACE PROJECTOR

Oscar F. Soetbeer, Massapequa Park, N. Y.

Application June 12, 1943, Serial No. 490,584

13 Claims. (Cl. 88—24)

This invention relates to improvements in apparatus for inspecting internal surfaces and projecting a magnified image of the inspected field upon a screen for visual observation or photographic recording. An apparatus for this purpose is disclosed in my pending application Ser. No. 435,284 filed March 19, 1942 now Patent Number 2,363,709, dated November 28, 1944, of which this application is a continuation in part.

One object of this invention is to provide a generally improved apparatus especially adapted for the inspection of the internal walls of engine cylinders and other objects having an internal bore which is closed at one end. Another object is to provide an apparatus in which the optical inspection system is stationary and the object to be inspected is so mounted and supported that it may be moved vertically and circumferentially so as to permit all points of the interior wall to be inspected. Still another object is to provide suitable indicating gages whereby the location of the invisible inspected field or spot may be accurately determined from outside the object. Another object is to provide precise focusing means for moving the object with relation to the optical system and at the same time maintain the mechanisms for vertical and rotatable movements of the object in operative relation thereto. Another object is to provide electrical driving means for raising and lowering the object and rotating the same including suitable safety devices to open the electrical circuits when certain limits of movements have been reached. Still other objects and features of this invention will be pointed out as this specification proceeds.

Accordingly the invention is embodied in an internal surface projection apparatus arranged and constructed as hereinafter set forth and as illustrated in the accompanying drawings in which Fig. 1 is a side view of the apparatus.

Fig. 4 is a top plan view of the stage assembly and platform which supports the object with some parts broken away.

Fig. 5 is a sectional view on the line 5—5 of Fig. 4.

Fig. 6 is a detail side view of parts of the platform and stage looking in the direction of the arrow 6 in Fig. 4, with parts removed.

Fig. 7 is a detail front view of the platform and stage showing the gages for locating selected inspected spots in the internal wall.

Fig. 8 is a detail view in section showing the driving means for raising and lowering the platform.

Fig. 9 is a sectional view of the optical system.

Fig. 10 is a wiring diagram.

Figure 1:
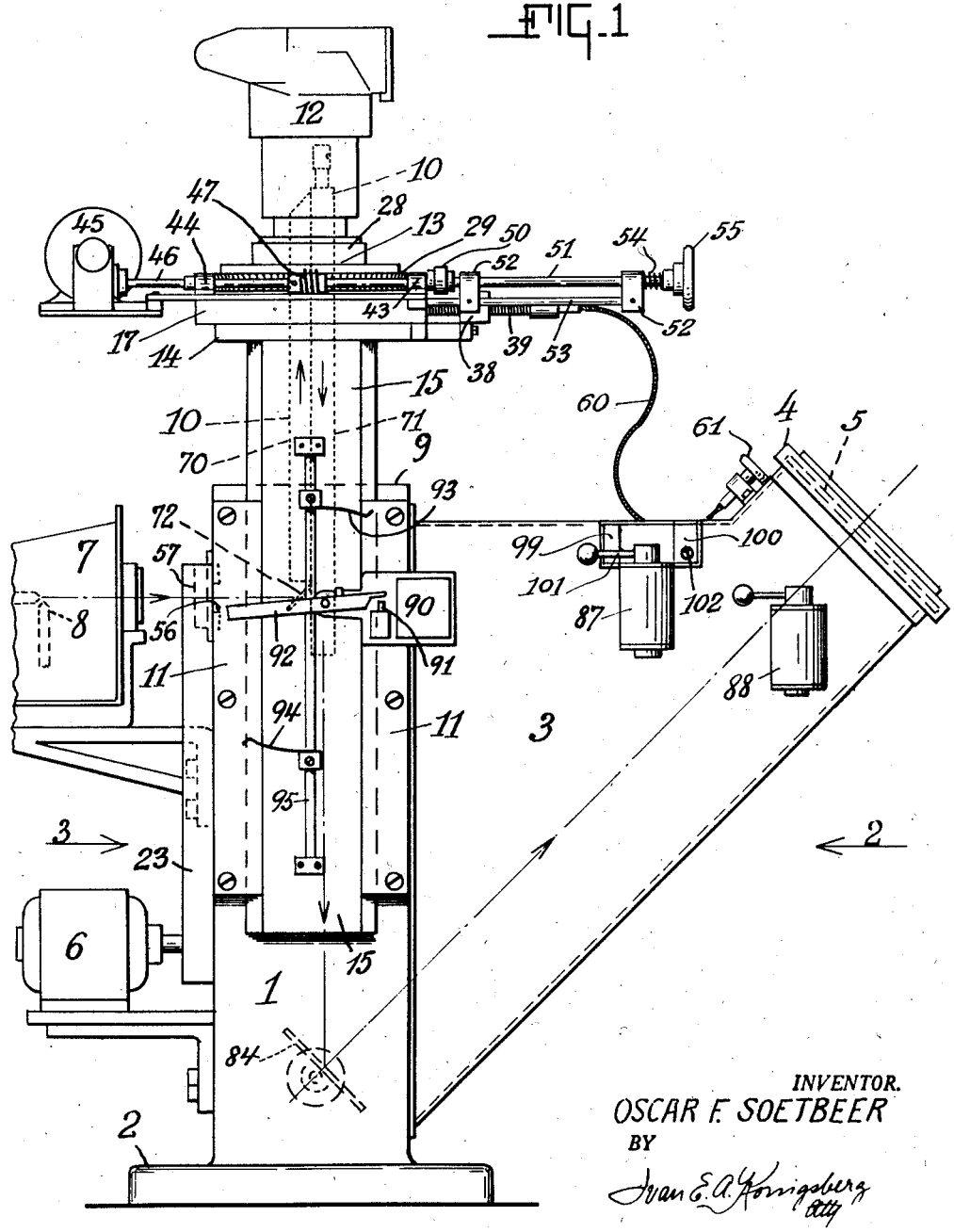
Figure 2:
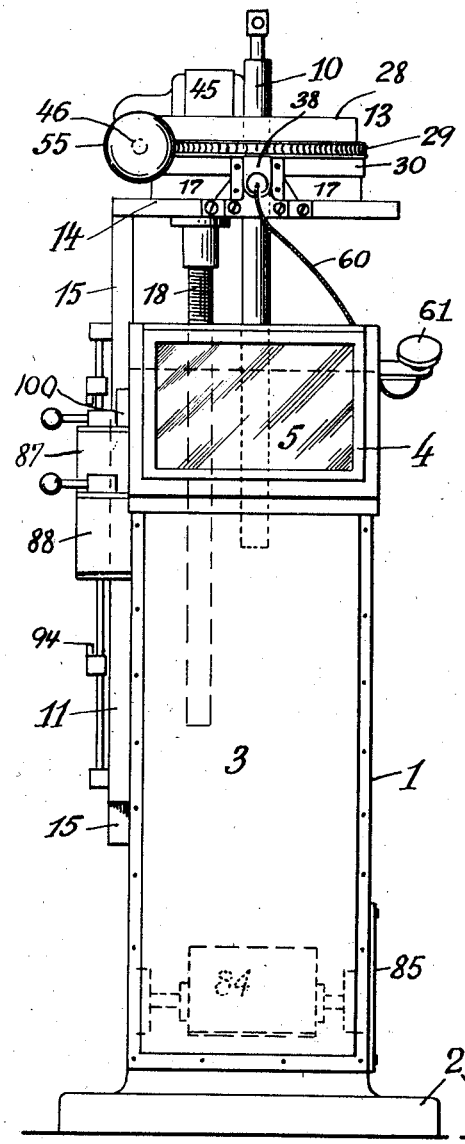
Fig. 2 is a front view looking in the direction of arrow 2 in Fig. 1.
Figure 3:
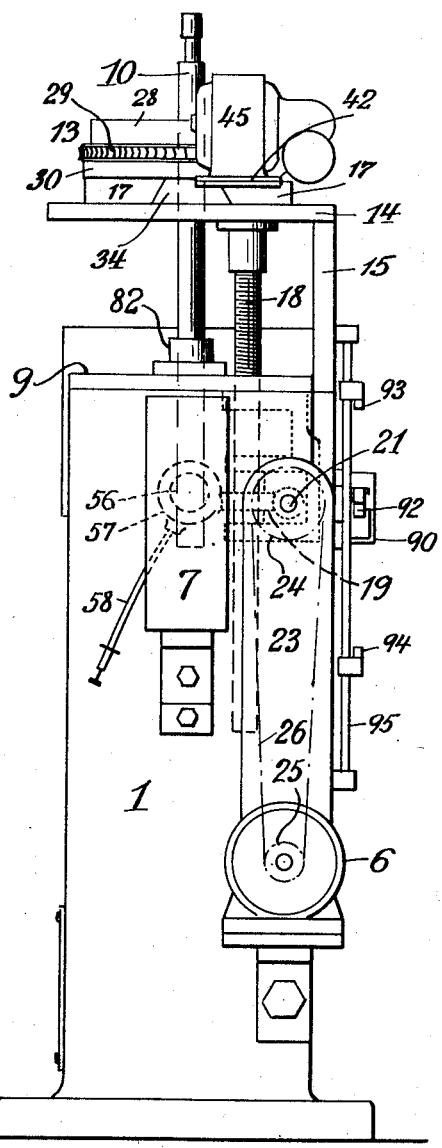
Fig. 3 is a rear view looking in the direction of arrow 3 in Fig. 1.

Referring first to Figs. 1, 2 and 3, the entire apparatus and associated parts and mechanisms are mounted upon a centrally disposed pedestal 1 which has a heavy foot piece 2 for good and rigid support. On the front side of the pedestal there is secured a hollow sheet metal casing 3 which carries a standard ground glass holder 4 with a ground glass screen 5. The holder is detachable (the same as ground glass holders on cameras) so that a sensitized photographic plate may be used instead of the ground glass. The rear side of the pedestal supports a platform raising reversible motor 6 and a standard carbon lamp 7, the carbons being indicated conventionally at 8. The pedestal is hollow and is closed at the top with a plate 9 which supports the optical system generally designated by the numeral 10 throughout the several views. The optical system will be explained later. The left side of the pedestal carries two dovetailed guides 11, 11.

Fig. 1 shows an aircraft engine cylinder 12 which is placed upon the stage assembly 13 of the apparatus. The assembly is carried by a platform 14 to which is secured a dovetailed support 15 which slides up and down between the guides 11. The platform is a rectangularly shaped plate, Figs. 4, 5 and 6, with a hole 16 through which the optical system tubes project. On top of the platform are secured two dovetailed guides 17, 17. Underneath the platform there is secured a screw shaft 18 which extends down into the pedestal, see Fig. 8, in threaded engagement with the bore of a rotatable worm gear 19. A suitable casting 20 secured to the pedestal supports the screw shaft and associated driving means. The worm gear 19 is driven from a worm 21 on a horizontal shaft 22. The latter extends through the pedestal into a gear box 23, Fig. 1. The shaft is suitably driven from the motor 6 by any desirable means such for example as indicated by sprockets 24, 25 and a chain 26. When the motor 6 is started it drives the shaft 21 and the worm gear 19 is rotated to cause the raising and lowering of the screw shaft 18 and the platform 14 depending upon the direction of rotation of the motor 6 as will be understood.

The engine cylinder 12 or other object under examination is placed within an adapter 28, Fig. 5, and rests upon a large worm gear 29 which forms a rotatable stage for supporting the object. The gear 29 is rotatably supported upon an annular race or bearing 37 which is a part of a plate 30 by means of a retainer ring 31, there being a ball bearing 32 between the gear and the bearing 37 as shown. The plate 30 is secured to two alined dovetailed slides 33 and 34 by screws as at 36, 36. The slides 33 and 34 fit and slide between the two dovetailed guides 17 on the platform 14. There are two alined slides 33 and 34 as seen in Fig. 4. The slide 33 is in front of the optical system. The slide 34 is in the rear thereof so as to permit operating the slides to focus the object without interfering with the optical system.

The focusing means comprise the following elements, Figs. 4, 5 and 6. To the platform 14 there is screwed a bearing 38. Through this bearing is threaded a focusing shaft 39. The inner end of this shaft is rotatably supported in known manner in a bracket 40 which is screwed fast to the front slide 33 and to the front edge of the plate 30. Hence, when the shaft 39 is rotated in the fixed bearing 38 the slides 33 and 34, which are both fast on the plate 30, together with said plate is moved longitudinally in either direction from front to rear of the apparatus, the slides moving between the guides 17.

The plate 30 carries a shelf 42 which supports two bearings 43 and 44 and a reversible electric motor 45. The bearings support the motor shaft 46 which carries a worm 47 in mesh with the large worm gear 29. At the forward end of the motor shaft there is secured a suitable clutch mechanism 50 whereby the shaft 46 may be hand operated from an extension shaft 51 with an operating knob 55. The extension shaft is supported in fixed guides 52 on a rod 53 secured to the platform 14, Fig. 1. A spring 54 normally keeps the extension shaft 51 unclutched from the motor shaft 46. When it is desired to drive the large gear 29 manually, the extension shaft is pushed inwardly against the force of the spring 54 into clutching engagement with the motor shaft 46, the motor circuit being open at this time as will be understood. When the gear 29 is to be motor driven, the operator releases the extension shaft which then is automatically unclutched from the motor shaft and the motor may then be started.

From the foregoing description it will be understood that the platform, stage assembly and object is moved vertically by operation of the motor 6 via the driving means to the screw shaft 18. The inner wall of the object is focused circumferentially by starting the motor 45 whereby the stage worm gear 29 is rotated. The object is focused horizontally by operating the shaft 39 to move the stage assembly 13 on the fixed guides 17. When the focusing shaft 39 is operated, the entire stage assembly namely the slides 33 and 34, the plate 30 with the annular bearing 37, the gear 29, the adapter 28, the shelf 42 and the motor 45 with its worm in mesh with the gear 29 is caused to move back and forth with relation to the fixed guides 17 and the platform whereby to bring any part of the inner wall of the cylinder 12 into focus in front of the objective of the optical system. Inasmuch as the motor 45 is in a fixed operative position with relation to the gear 29 the latter and the object may be rotated irrespective of the position of the object in the focusing axis. Because of the varying lateral positions of the stage assembly the focusing shaft 39 is operated by a flexible extension shaft 60 mounted in a bracket on the casing 3 as seen in Figs. 1 and 2. A knob 61 is attached to the flexible shaft.

The adapter 28 may have a scale 63 to be read with reference to a fixed index finger 64 fastened to a hood 65 which is secured to the plate 30 for the purpose of protecting the stage driving means, Figs. 5 and 7. Thus any point under examination on the internal wall of the cylinder 12 may be located circumferentially and marked on the outside of the cylinder for relocation later on. Likewise the location of any certain internal point may be determined axially of the cylinder by an adjustable depth gage 66 secured to the platform 14 and which may be read with reference to a fixed pointer 57 on the pedestal 1, Fig. 7. A pilot lamp 68 may be provided for illuminating the scale.

The internal surface projection according to this invention is carried out by means of the optical system 10 which comprises certain lenses, prisms and mirrors arranged as illustrated in Fig. 10. The system is contained within two tubes. An illuminating tube 70 and a microscope tube 71. The beam of light from the lamp 8 passes through an opening 56 in the pedestal to a reflecting mirror 72 at the bottom of the tube 70. This mirror reflects the light upwards through the tube which contains a plurality of suitable lenses and stops 73 and 74 respectively arranged in optically operative relation, the lenses forming intermediary images of the light source, and whereby the light beam is directed towards a first surface total reflecting prism 75. The light beam then passes on to a second total reflecting prism 76 and is again reflected upwards towards a reflecting mirror 77 first passing through an objective lens 69 in such a manner that only one half of the aperture is used for illuminating purposes. The mirror 77 reflects the light beam upon the object surface 78 to be inspected. The illuminated image rays of the object are then reflected back onto the mirror 77 and down through the other half of the objective lens and down through the microscope tube 71 which has the usual field lens 79 and an eyelens 80. The tubes are joined at their tops by a transverse tube 81 for supporting the prisms. The tubes 70 and 71 are suitably held in a flange mounting 82 which is secured to the plate 9 on top of the pedestal, there being also suitable spacing and holding members 83. As will be seen from Fig. 1 the light beam passes from the lamp, through the opening 56 to the reflecting mirror 72, then up and again down through the optical tubes to a reflecting mirror 84 which reflects the magnified image on to the ground glass 5 for observation. The pedestal has a door at 85 for access to the mirror 84. An ordinary photographic shutter 57 with remote control 58 may be mounted in front of the opening 56.

The motor 6 is operated to raise and lower the platform and the object. Inasmuch as the interior of the object cannot be seen from the outside it is necessary to provide means for limiting the vertical movement in either direction or on the downward stroke the closed end of the object would hit the optical system and injure it and on the upward stroke the screw shaft 18 may become disengaged from its driving mechanism. By referring to Fig. 1 it will be seen that two reversing switches 87 and 88 are mounted on the casing 3 so as to be within easy reach of the operator who sits in front of the apparatus. A normally closed safety switch 90 is mounted on the pedestal and has a plunger 91 adapted to be depressed by a lever 92 to open the safety switch. The sliding platform support 15 carries two safety stops 93 and 94 adjustably secured to a rod 95 fast on the support 15. When the platform has been lowered to the permissible limit the stop 93 strikes the lever 92 to open the safety switch to open the circuit to the motor 6. When the platform has been raised to the permissible limit the other stop 94 strikes the lever 92 and the safety switch is again opened as will be understood. Two starting switches 99 and 100 are mounted immediately above the reversing switch 87. The latter has an operating handle 101 which is also arranged to actuate the starting switches as will be explained.

Referring now to the diagram in Fig. 10 the reversing switch 87 has a shaft 104 to which suitable contact members are secured for making connections between the different contacts in the switch. In Fig. 10 the handle 101 has been moved into starting position to close the circuit through the motor 6. The circuit may be traced from the incoming line wire 106 through the safety switch 99, which is normally closed, to line contact 109, to contact member 110, to contact 107, to the motor 6 and return to contact 108, contact member 112, contact 113 and out through line wire 114. The platform is now going up and may be stopped in any position by merely moving the switch handle 101 to neutral position. If however the circuit is kept closed, it will automatically be broken when the stop 94 strikes the lever 92 to open the safety switch. Now the circuit is open and the motor stops running. The platform remains in its extreme upper position.

To close the circuit to start the motor in the reverse direction so as to lower the platform the operator moves the handle 101 around, to the right in the drawing, to close the starting switch 100. The contact members 110 and 112 are now in a position about 180 degrees from that shown as will be understood. The closing of the starting switch 100 is done by pressing a flexible portion 114 on the switch handle 101 against the plunger in the switch 100. The circuit is now closed again and may be traced as follows. From line wire 106 to switch 100, contact 109, across via contact member 110 to contact 115, to motor 6, reversing the latter. Then the return to contact 116, across contact member 112 to line contact 113 and out to line wire 114. The platform now descends and the operator releases the pressure on the starting switch 100 and brings the handle 101 into running position for the motor circuit. The starting switches have spring pressed plungers 98 as indicated to normally open said switches. The circuit is now via the safety switch which automatically closes as soon as the limiting stops are moved away, the lever 92 being weighted at its free end as shown in Fig. 1. When the platform reaches its lowermost permissible limit the stop 93 strikes the lever 92 and the safety switch is again opened so as to open the motor circuit and the motor stops running. Now the operator moves the switch handle 101 over to the left and against the plunger 98 in the starting switch 90 which now acts to close the circuit to start the motor in the reverse direction and the platform ascends.

The other reversing switch 88 is operated to start the motor 45 to rotate the gear 29 in either direction. In the position shown in Fig. 10 the circuit to the motor 45 is from line wire 106 to contacts 118 and 119, to motor 45 and return to contacts 120 and 121 to line wire 114. The reverse circuit is from wire 106 to contacts 118, 119 and 122, to motor 45 and return to contacts 123 and 121 and to line wire 114, it being understood that when the switch is reversed the contact members 124 and 125 are in opposite positions to those shown in the diagram.

*Operation.*—When it is desired to practice internal surface projection with the apparatus the platform is raised to a convenient height and the object placed upon the stage assembly by means of a suitable adapter. Then the current is turned on in the lamp and the inspection can begin. First the object is focused by operating the focusing shaft 39 and the object may also be rotated to insure sharp focus. Thereafter, the operator, sitting in front of the machine, rotates the object and raises and lowers it until a thorough inspection of the inner wall of the object has been completed. Whenever the location of a particular field or spot is to be noted the two gages 63 and 66 are observed and the object marked. The operation may be done very slowly or very rapidly depending upon the conditions observed. An apparatus embodying this invention has been constructed and tested with most satisfactory results. The dimension of the illuminated field is about two and one half millimeters which is magnified to cover the ground glass which may be of standard size or about eight inches by twelve inches. A clear picture of the inner wall is obtained. If a photographic record is wanted a sensitized plate is used instead of the ground glass and the photographic shutter is operated accordingly.

Surface inspection is known to the art of metallurgy and may be practiced by examining specimens under a microscope or the latter may be placed directly upon a part to be inspected. This however is possible only with respect to visible external surfaces as is obvious. Inspection of the contours or outlines of internal surfaces is also known. For example a profilometer may be used for this purpose and prior devices have been used for the purpose of inspecting the grooves in rifled guns and weapons. Apparatus also have been devised for examining internal screw threads and project the profile thereof for comparison with standard patterns. So far as I know the apparatus herein disclosed is broadly new and basic in its construction and mechanisms for practicing microscopic inspection of internal surfaces and projecting a magnified image of the inspected field for visual observation. The apparatus may of course be used for inspecting hollow open ended objects. In such case a temporary closure may be provided for the one open end if found necessary.

I claim:

1. An apparatus for microscopically examining an internal surface in an object comprising a pedestal, an optical system for forming a magnified image of said internal surface, said system including an objective, means for securing said system to the said pedestal, an object supporting platform movably secured to said pedestal, means on the latter and said platform for raising and lowering the platform to position the said internal surface in operative optical relation to the said objective, means for automatically stopping the said raising and lowering movements when said platform has been raised or lowered to a predetermined extent, means on said platform for focusing the said internal surface in the object on the platform with respect to the said objective and a lamp on said pedestal for illuminating the surface to be examined.

2. An apparatus for microscopically examining an internal surface in an object comprising an optical system including an objective, means for supporting said system in a predetermined fixed position, a movable annular stage adapted to receive the object and support the same in operative relation to said objective, means for slidably moving said stage to focus the internal surface in a lateral direction with respect to said objective, means for rotating said stage to position the internal surface with respect to said objective or for rotating said stage to position selected portions of the focussed internal surface in image forming relation to the objective, means for illuminating the internal surface for optical examination and means for operating said sliding and rotating means.

3. An apparatus according to claim 2 including mechanism for raising and lowering said annular stage with respect to the objective of the optical system and electrically operated driving means for operating the said mechanism.

4. An apparatus for microscopically examining an internal surface in an object, said internal surface being invisible and inaccessible for microscopic optical examination from outside the object, comprising an optical system including an objective for forming a magnified image of the internal surface, means for securing said objective in a fixed predetermined position, means for movably supporting the object with said internal surface in operative relation to said objective, means for focusing the said internal surface with respect to the objective, a screen for receiving the magnified image of the surface focused by the said optical system, gage means for locating upon the outside of said object the positions of selected portions of said internal surface which are observed in the image upon said screen and means for operating the said focusing means.

5. An apparatus for projecting an image of the internal surface of a cylinder upon a screen for visual observation of all points or portions of said surface comprising an immovable optical system for forming a magnified image of any point or portion of the said internal surface, said system including an objective, means for supporting said cylinder to enclose the objective in movable relation thereto, mechanisms, independently operable, for moving the cylinder vertically, horizontally and circumferentially to focus any portion of the internal surface with respect to the objective, means for operating said mechanisms, means for illuminating said internal surface and a screen upon which the illuminated magnified image of said surface is projected.

6. An apparatus according to claim 5 including means for photographing the magnified image of the internal surface.

7. An apparatus for projecting upon a screen an image of a portion of the piston travelled area of an engine cylinder comprising an optical system including an objective, means for supporting said system in a fixed predetermined position, movable means adapted to receive and support the engine cylinder in position to enclose the said objective within the cylinder, devices, selectively and independently operable, for moving the said cylinder receiving and supporting means vertically, horizontally and rotatably to focus a portion of said surface area with respect to the said objective, mechanisms for actuating the said devices, a lamp for illuminating said surface area and a screen upon which the image of said focused portion of the cylinder surface is projected.

8. An apparatus according to claim 7 including means for photographing the magnified image of the focused illuminated portion of the cylinder surface.

9. An apparatus according to claim 7 including means for automatically limiting the vertical movements of the said cylinder supporting means to accord with the length of the piston travelled area within the cylinder.

10. An apparatus for microscopically examining the internal wall forming the piston travelled area within an engine cylinder comprising an immovable optical system including an objective, movable means adapted to receive and support the engine cylinder in a position enclosing said objective, mechanisms for operating said movable cylinder supporting means to move the cylinder vertically in both directions with respect to the said objective, a device for limiting the vertical movements of the cylinder to accord with the length of said cylinder area and for automatically operatively disconnecting the said vertically movable cylinder supporting means from the said operating mechanisms when the cylinder has been moved vertically up or down a distance equal to the axial length of the said piston travelled area and a lamp for illuminating said area.

11. An apparatus of the character described comprising an immovable optical system including an objective, movable means adapted to receive and support an engine cylinder in position enclosing said objective, mechanism for operating said movable cylinder supporting means to move the cylinder vertically in opposite directions to place any selected portion of the internal cylinder wall in operative alinement with the said objective and power driven mechanism, operable irrespective of the vertical position of the cylinder, for rotating said movable cylinder supporting means laterally in both directions with respect to the objective to focus selected portions of the internal cylinder wall.

12. An apparatus according to claim 11 including manually actuated means for disconnecting the cylinder supporting means from the said power driven mechanism and rotating the cylinder by manual operation.

13. In an apparatus for microscopically examining the internal wall of an engine cylinder, an optical system for forming and projecting a magnified image of said wall for visual observation comprising an illuminating optical system, a tube enclosing said illuminating system, a microscope optical system including an objective, a second tube enclosing the latter, means for supporting said tubes in parallel fixed relation, light reflecting elements interposed between said illuminating system and said microscope system outside the axis of the latter for receiving a light beam from the illuminating system and reflect the beam to and through one half of the said objective, a light reflecting element for receiving the light beam from the objective and directing it towards the said cylinder wall and for reflecting the image forming rays from the said wall and back into the microscope system through the other half of the said objective, a lamp for directing a light beam into the illuminating system, a screen for receiving the image of the said cylinder wall, means for supporting the said cylinder in position enclosing the said objective and means for focusing the cylinder wall with respect to the objective.

OSCAR F. SOETBEER.